US007322045B2

(12) United States Patent
Kiddy

(10) Patent No.: US 7,322,045 B2
(45) Date of Patent: Jan. 22, 2008

(54) METHOD OF OBFUSCATING COMPUTER INSTRUCTION STREAMS

(75) Inventor: Raymond R. Kiddy, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 537 days.

(21) Appl. No.: 10/763,881

(22) Filed: Jan. 23, 2004

(65) Prior Publication Data

US 2004/0151306 A1 Aug. 5, 2004

Related U.S. Application Data

(63) Continuation of application No. 09/915,827, filed on Jul. 25, 2001, now Pat. No. 6,694,435.

(51) Int. Cl.
*G06F 7/04* (2006.01)
*G06F 17/30* (2006.01)

(52) U.S. Cl. .............................. 726/26; 726/27; 726/30; 713/162; 713/165; 713/167; 713/189; 717/136; 717/140; 717/148; 717/162

(58) Field of Classification Search ................ 380/282, 380/30, 36; 713/189, 167, 162, 165; 726/27, 726/26, 30; 717/136, 140, 148, 162
See application file for complete search history.

(56) References Cited

U.S. PATENT DOCUMENTS

| 5,485,620 | A | * | 1/1996 | Sadre et al. ................. 717/162 |
| 5,892,899 | A | * | 4/1999 | Aucsmith et al. ............. 726/27 |
| 5,903,761 | A | | 5/1999 | Tyma |
| 5,978,883 | A | * | 11/1999 | Hanna ........................... 711/5 |
| 6,059,840 | A | | 5/2000 | Click, Jr. |
| 6,102,966 | A | | 8/2000 | Tyma |
| 6,427,234 | B1 | * | 7/2002 | Chambers et al. ........... 717/140 |
| 6,694,435 | B2 | * | 2/2004 | Kiddy ......................... 713/189 |
| 7,134,119 | B2 | * | 11/2006 | Nevill ......................... 717/139 |

(Continued)

FOREIGN PATENT DOCUMENTS

WO WO-99/01815 * 1/1994

(Continued)

OTHER PUBLICATIONS

Cosoroaba, Synchronous DRAM Evolutionary Changes Bring Cost/Performance Advantages in Memory Systems, 1996, IEEE, pp. 360-364.*

(Continued)

*Primary Examiner*—Kim Vu
*Assistant Examiner*—Beemnet W Dada
(74) *Attorney, Agent, or Firm*—Blakely, Sokoloff, Taylor & Zafman LLP

(57) ABSTRACT

Methods and apparatuses for obfuscating computer instruction streams. In one aspect of the invention, an exemplary method includes breaking each of at least two operative instruction streams into a plurality of parts and interleaving the parts into a new instruction stream. In another aspect of the invention, an exemplary method includes breaking each of at least two operative instruction streams into a plurality of parts and interleaving the parts with obfuscation codes into a new instruction stream. The obfuscation codes interrelate the parts from different instruction streams to prevent reversal of interleaving.

49 Claims, 11 Drawing Sheets

U.S. PATENT DOCUMENTS 7,152,223 B1 * 12/2006 Brumme et al. ............ 717/116

FOREIGN PATENT DOCUMENTS

WO        WO 99/01815 A1      1/1999

OTHER PUBLICATIONS

Low, Java Control Flow Obfuscation, 1998, www.cs.arizona.edu pp. 19-25.*

Collberg, Thomborson and Low, A Taxonomy of Obfuscating Transformation, Technical Report Department of Computer Science, University of Auckland Jul. 1997.*

Rugaber, et. al. The Interleaving Problem in Program Understanding, Proc. of the secon working conference on Reverse Engineering IEEE Jul. 1995.*

PCT International Search Report for PCT Int'l Appln No. US 02/23605 mailed Nov. 26, 2002 (7 pages).

Christian Collberg, Clark Thomborson & Douglas Low, "A Taxonomy of Obfuscating Transformations." *Technical Report, Department of Computer Science, University of Auckland*, No. 148 (Jul. 1997), pp. 1-36.

Spencer Rugaber, Kurt Stirewalt, & Linda M. Wills, "The Interleaving Problem in Program Understanding." *Proceedings of the Second Working Conference on Reverse Engineering* (Jul. 1995), pp. 1-10.

* cited by examiner

METHOD OF OBFUSCATING COMPUTER INSTRUCTION STREAMS

This application is a continuation application of U.S. patent application Ser. No. 09/915,827, filed Jul. 25, 2001 U.S. Pat. No. 6,694,435.

FIELD OF THE INVENTION

The present invention relates to the field of computer science, and more particularly to a method and apparatus for obfuscating computer instruction streams.

BACKGROUND OF THE INVENTION

Some modern compilers, most notably the Java compiler from Sun Microsystems, are designed to compile source code (e.g. Java Programs or Java Applets) into sequences of instructions to be executed on a stack-based virtual machine. A key benefit of compiling source code for execution on a virtual machine is that any processor that can be programmed to implement a virtual machine, regardless of the processor's internal architecture, may execute the compiled code.

When a human readable unit of source code is compiled into a stream of instructions for a virtual machine by a typical compiler, the mechanically compiled virtual machine instructions can be deterministically transformed back into a version of the human readable source code. This process of de-compilation of instructions for a virtual machine into a version of the human readable source code enables reverse engineering of the intellectual properties embedded in the source code. After spending a large amount of time and resources developing a software program, developers do not want to place their applications in the public domain in a form that gives away their efforts.

Obfuscation is the process of transforming a stream of computer instructions into another stream of instructions that executes the same set of logical operations as that in the original stream so that it is more difficult to be transformed back into a version of the human readable source code.

FIG. 1 shows one example of an obfuscation method according to one embodiment of the prior art. In operation 341 a typical compiler converts a unit of human readable source code 302 into a virtual machine instruction stream 304 which can be easily de-compiled into a version of the human readable source code. To obfuscate the virtual machine instruction stream 304, operation 343 breaks the stream 304 into a set of parts 310. These parts are transformed and padded with dummy instructions in operation 345. For example, part 316 is transformed into part 324, which is padded with dummy instructions 322. The transformations in operation 345 may include reversing loops, expanding loops, flow transformation, renaming identifiers, etc. After the transformation and padding, operation 347 assembles the set of transformed and padded parts 320 into a new instruction stream 330. The new instruction stream is obfuscated and more difficult to be de-compiled into a version of the human readable source code than the mechanically compiled instruction stream 304.

Dummy instructions 322 are not intended to be executed by a virtual machine for efficiency. For example, null instructions may be used as the dummy instructions to change the patterns of mechanically compiled instruction streams in order to prevent some software programs from de-compiling the instruction stream into a version of the human readable source code.

FIG. 2 shows a block diagram of an obfuscation method according to one example of the prior art. Operation 202, corresponding to the operation 343 in FIG. 1, breaks a virtual machine instruction stream into parts. Operation 204 transforms the parts; operation 206 pads the transformed parts with dummy instructions. Operations 204 and 206 correspond to the operation 345 in FIG. 1. Operation 208, corresponding to operation 347 in FIG. 1, assembles the padded and transformed parts into a new instruction stream.

However, the obfuscation methods as in FIGS. 1 and 2 are subject to attack. The distinct characteristics of the parts, which are taken from a logically cohesive source, and the dummy instructions, which do not perform any logical operation, make it possible to filter out the dummy instructions from the obfuscated instruction stream. Just as chaff can be separated from wheat because of the different physical characteristics, so can be the dummy instructions when an obfuscated instruction stream is compared to an instruction stream that is from a logically cohesive source. The chaff can be seen and removed. The dummy instructions may be shown to be garbage or not producible from a valid source, and thus be detected and removed.

Since in operation 204 the transformations applied to the parts are chosen from a transformation library, a large pool of obfuscated virtual machine instruction streams may be processed to derive the transformation library. With a derived transformation library, an obfuscated instruction stream produced according to the methods in FIGS. 1 and 2 can be transformed back into a version of a human readable source code once the dummy instructions are removed.

SUMMARY OF THE INVENTION

Methods and apparatuses for obfuscating computer instruction streams to prevent reverse engineering the human readable source codes of the instruction streams are described here.

In one aspect of the present invention, an exemplary method includes breaking each of at least two operative instruction streams into a plurality of parts and interleaving the parts into a new instruction stream.

In another aspect of the present invention, an exemplary method includes breaking each of at least two operative instruction streams into a plurality of parts and interleaving the parts with obfuscation codes into a new instruction stream. The obfuscation codes interrelate the parts from different instruction streams to prevent reversal of interleaving.

In another aspect of the present invention, an exemplary method includes breaking each of at least two operative instruction streams into a plurality of parts, transforming and interleaving the parts into a new instruction stream. In one example according to this aspect, the parts are transformed so that the new instruction stream performs at least the same logical operations of one of the operative instruction streams.

The present invention includes apparatuses which perform these methods, including data processing systems which perform these methods and machine readable media which when executed on data processing system cause the systems to perform these methods.

The present invention also includes machine readable media which contain obfuscated computer instruction streams produced by these methods.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

DETAILED DESCRIPTION

The subject invention will be described with reference to numerous details set forth below, and the accompanying drawings will illustrate the invention. The following description and drawings are illustrative of the invention and are not to be construed as limiting the invention. Numerous specific details are described to provide a thorough understanding of the present invention. However, in certain instances, well known or conventional details are not described in order not to unnecessarily obscure the present invention in detail.

Figure 1:
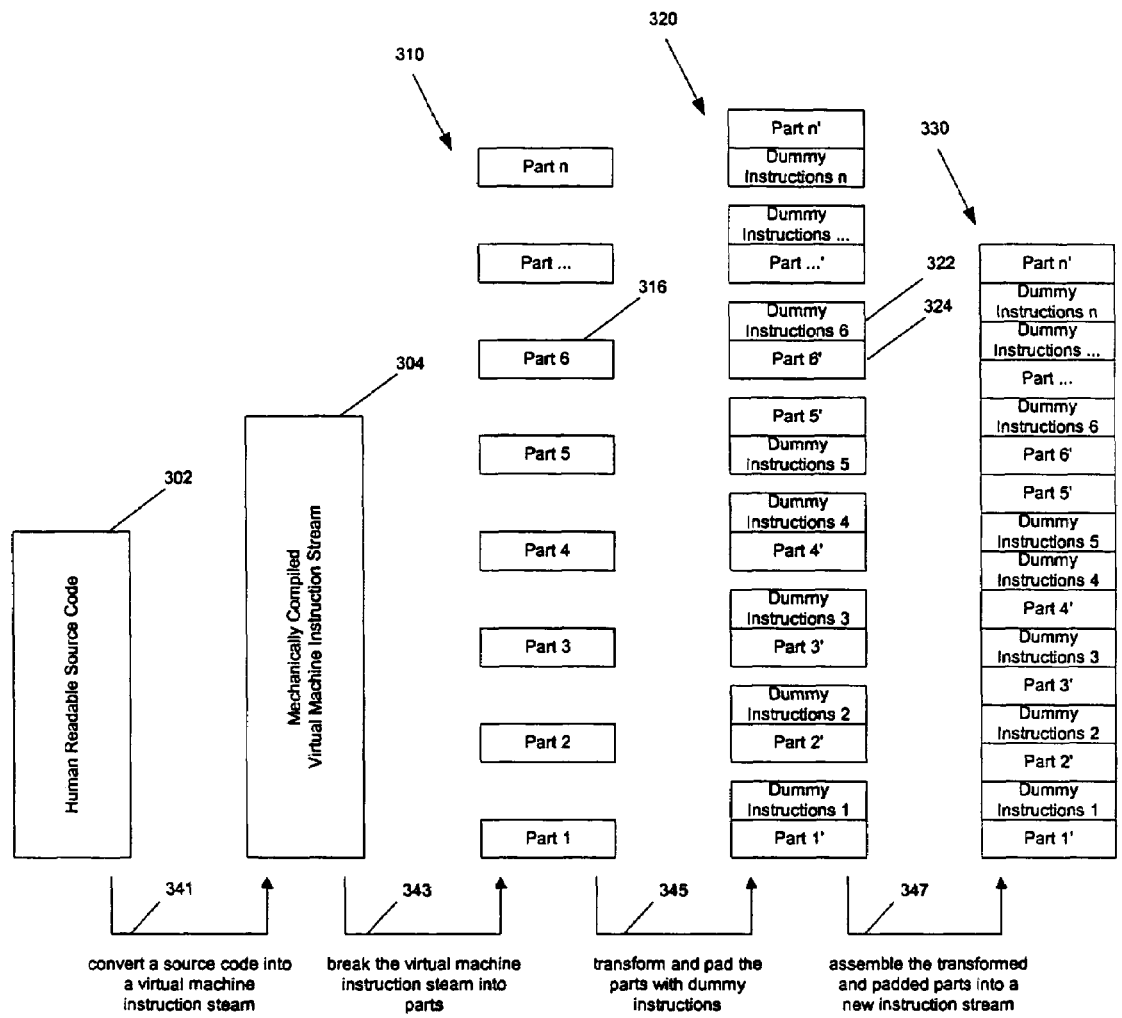
FIG. 1 shows a method of obfuscating a computer instruction stream according to one example of the prior art.
Figure 2:
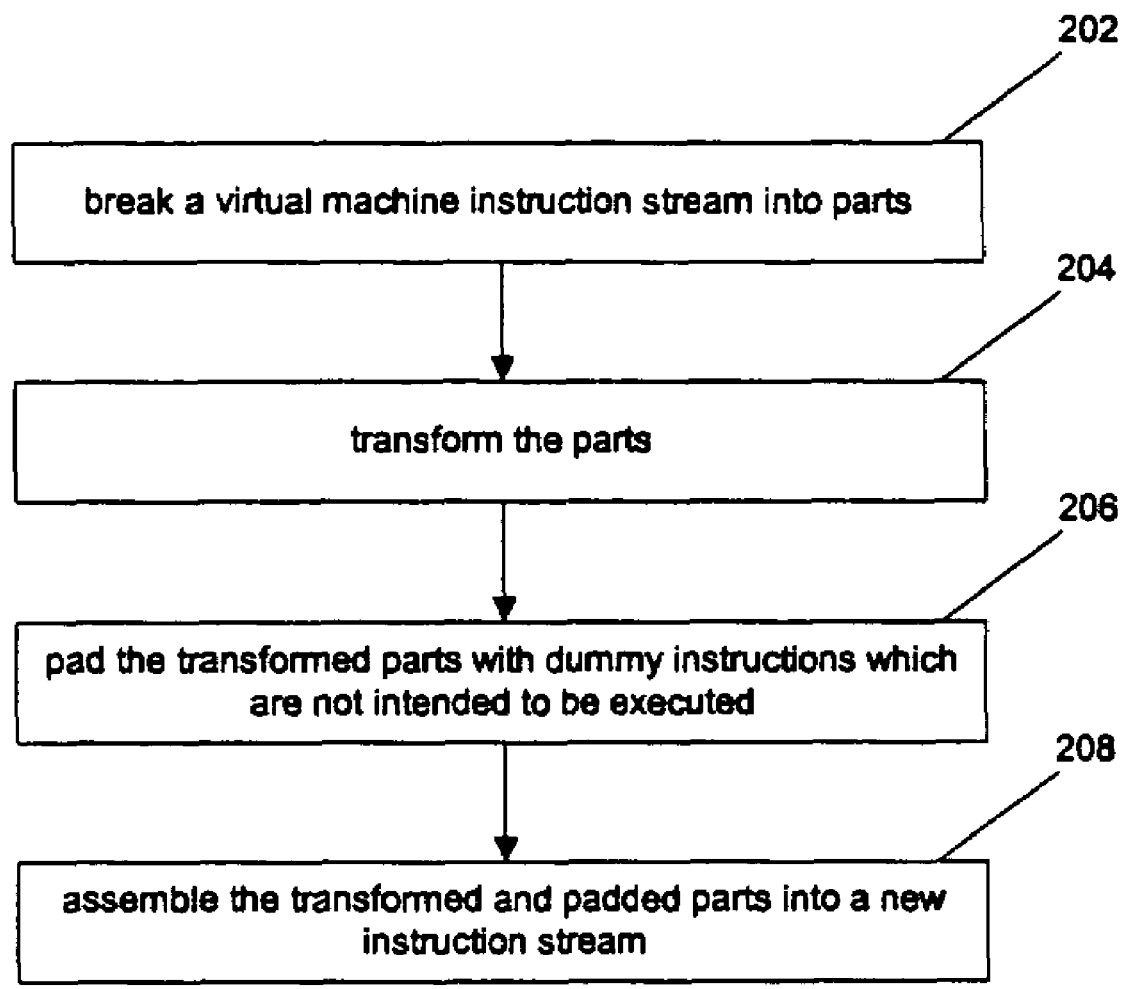
FIG. 2 shows a block diagram of an obfuscation method according to one example of the prior art.
Figure 3:
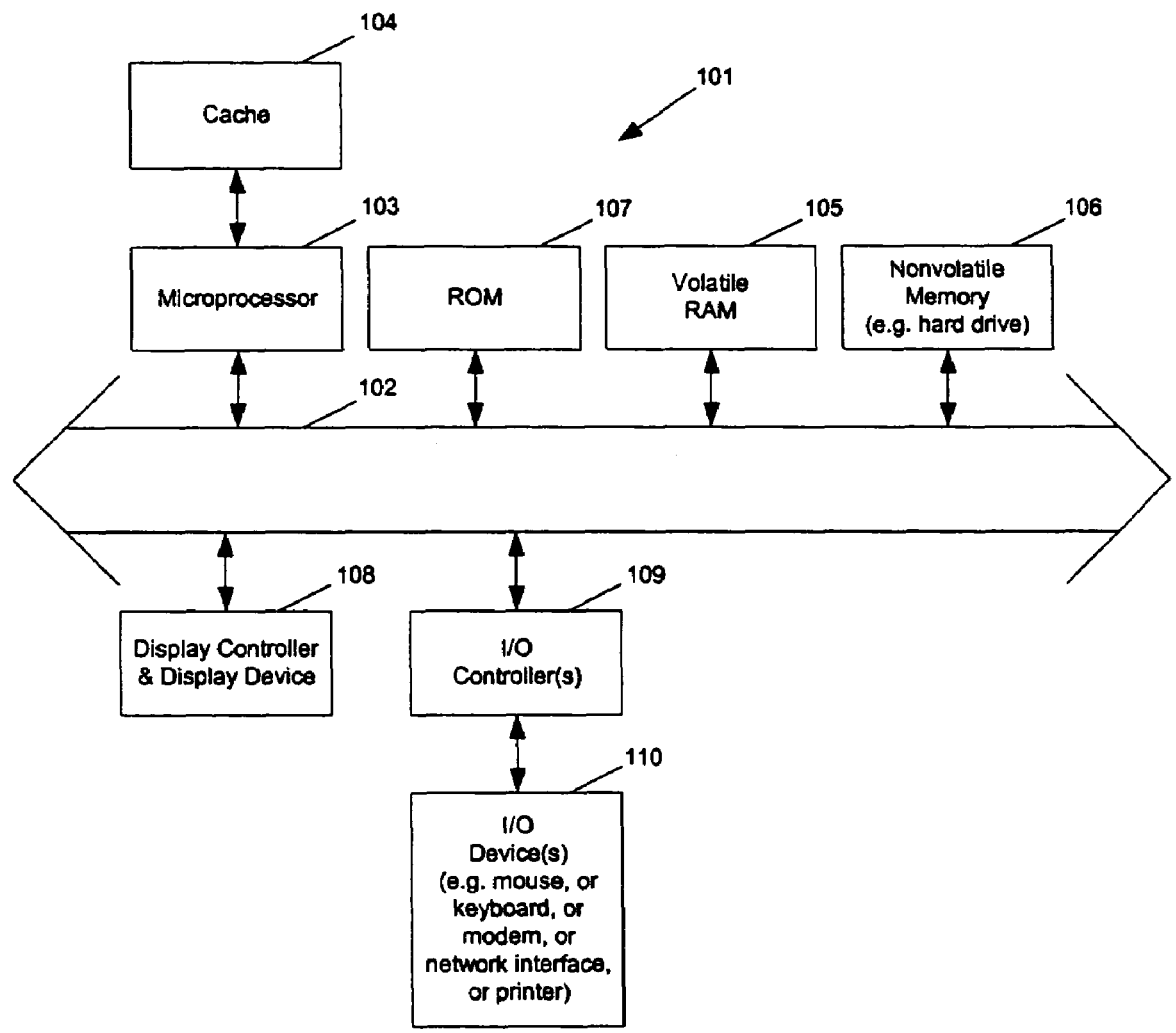
FIG. 3 shows a block diagram example of a data processing system which may be used with the present invention.

FIG. 3 shows one example of a typical computer system which may be used with the present invention. Note that while FIG. 3 illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention. The computer system of FIG. 3 may, for example, be an Apple Macintosh computer.

As shown in FIG. 3, the computer system 101, which is a form of a data processing system, includes a bus 102 which is coupled to a microprocessor 103 and a ROM 107 and volatile RAM 105 and a non-volatile memory 106. The microprocessor 103, which may be a G3 or G4 microprocessor from Motorola, Inc. or IBM is coupled to cache memory 104 as shown in the example of FIG. 3. The bus 102 interconnects these various components together and also interconnects these components 103, 107, 105, and 106 to a display controller and display device 108 and to peripheral devices such as input/output (I/O) devices which may be mice, keyboards, modems, network interfaces, printers and other devices which are well known in the art. Typically, the input/output devices 110 are coupled to the system through input/output controllers 109. The volatile RAM 105 is typically implemented as dynamic RAM (DRAM) which requires power continually in order to refresh or maintain the data in the memory. The non-volatile memory 106 is typically a magnetic hard drive or a magnetic optical drive or an optical drive or a DVD RAM or other type of memory systems which maintain data even after power is removed from the system. Typically, the non-volatile memory will also be a random access memory although this is not required. While FIG. 3 shows that the non-volatile memory is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 102 may include one or more buses connected to each other through various bridges, controllers and/or adapters as is well known in the art. In one embodiment the I/O controller 109 includes a USB (Universal Serial Bus) adapter for controlling USB peripherals.

It will be apparent from this description that aspects of the present invention may be embodied, at least in part, in software. That is, the techniques may be carried out in a computer system or other data processing system in response to its processor, such as a microprocessor, executing sequences of instructions contained in a memory, such as ROM 107, volatile RAM 105, non-volatile memory 106, cache 104 or a remote storage device. In various embodiments, hardwired circuitry may be used in combination with software instructions to implement the present invention. Thus, the techniques are not limited to any specific combination of hardware circuitry and software nor to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as the microprocessor 103.

At least one embodiment of the present invention seeks to produce obfuscated streams of virtual machine instructions that are not reversible into a version of human readable source codes. According to the present invention, parts of a number of operative instruction streams are interleaved to produce a combined instruction stream. The combined instruction stream is obfuscated so that it cannot be decompiled into a version of the human readable source code. Since parts of operative instruction streams are interleaved, each part of the obfuscated stream is a logically cohesive part of an instruction stream. No part of the obfuscated instruction stream can be shown to be garbage or not producible from a valid source. For simplicity, an operative instruction stream will be understood to be a series of instructions corresponding to a method in a source code (e.g., a method in a class, a function, or a subroutine).

In one embodiment of the present invention, stack-based instruction streams, such as instruction streams for a Java virtual machine, are broken into a number of stack-balanced blocks. Stack-balanced blocks are instruction sequences that, after execution, leave the stack in the same state as before execution. More specifically, a stack-balanced block is a sequence of instructions that, when executed, causes an equal number of stack push and pop operations to take place in an order such that, throughout execution of the sequence of instructions, the number of completed stack pop operations does not exceed the number of completed stack push operations. Thus, it is perfectly legal for instructions within a stack-balanced block to push values onto the stack, but the values must be popped off the stack by the end of stack-balanced block so that the stack is unchanged.

When a block of stack-balanced instructions is inserted into an instruction stream, the stack operations caused by the block of stack-balanced instructions do not interfere with the stack operations of the original instruction stream. The local variables used by the block of stack-balanced instructions may be changed so that the operation of the block of stack-balanced instructions has no side effect on the local variables used by the original instruction stream. The local variables and values on the stack may also be transformed within these blocks via functions which, when executed over the course of the entire method in series with the intended function of the method, equal the identity function applied to the intended function of the method. In some embodiments of the present invention, side effects may be intentionally preserved so that the inserted block of stack-balanced instructions enriches the functionality of the original instruction stream. Access to a non-local variable by the block of stack-balanced instructions may be substituted by access to a variable of the same type, which is accessible to the original instruction stream.

Figure 4:
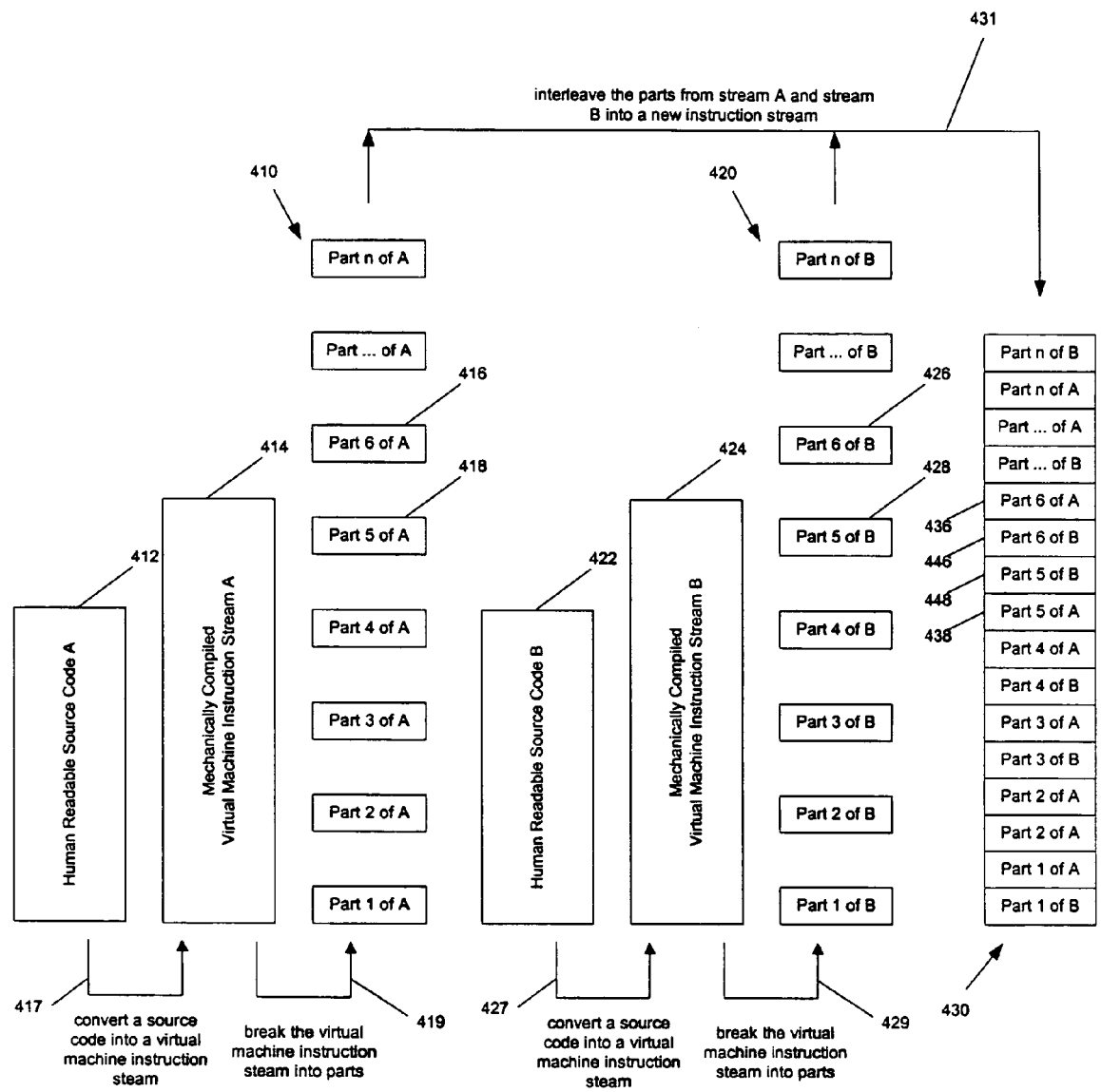
FIG. 4 shows a method of obfuscating computer instruction streams according to one embodiment of the present invention.

FIG. 4 shows a method of obfuscating computer instruction streams according to one embodiment of the present invention. In operations 417 and 427 human readable source codes 412 and 422 are mechanically compiled into instruction streams 414 and 424, which can be easily de-compiled into a version of human readable source codes. To obfuscate them, the instruction streams 414 and 424 are broken into parts. The instruction stream 414 is broken into a set of parts 410; the instruction stream 424 is broken into a set of parts 420.

After the instruction streams 414 and 424 are broken into parts, operation 431 interleaves these parts into a new instruction stream 430. For example, parts 426 and 428 taken from the instruction stream 424 are inserted between parts 416 and 418 taken from the instruction stream 414. As a result, in the obfuscated instruction stream 430, parts 446 and 448, which correspond to parts 426 and 428 from the instruction stream 424, are located between parts 436 and 438, which correspond to parts 416 and 418 from the instruction stream 414.

Figure 5:
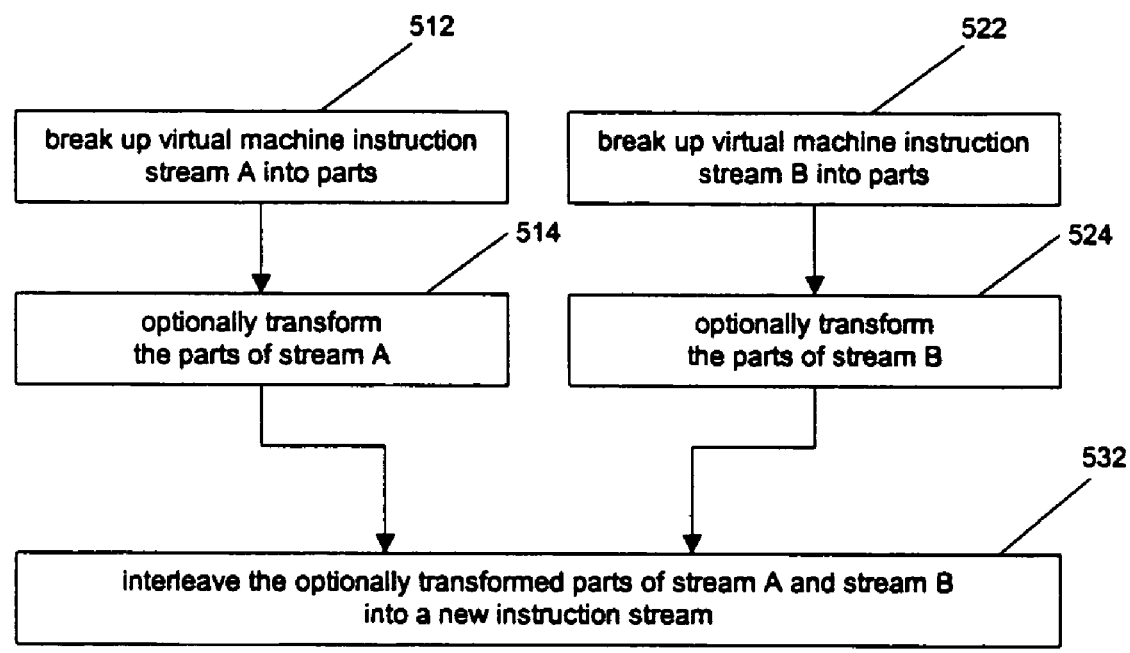
FIG. 5 shows a block diagram of an obfuscation method according to one embodiment of the present invention.

FIG. 5 shows a block diagram of an obfuscation method according to one embodiment of the present invention. Operations 512 and 522, corresponding to operations 419 and 429 in FIG. 4, break the operative instruction streams into parts. After the instruction streams are broken into parts, the parts are optionally transformed in operations 514 or 524. The optional transformations may involve reversing loops, expanding loops, flow transformation, renaming identifiers, changing the usage of variables, eliminating or substituting instructions, etc. Finally, the optionally transformed parts are interleaved into a new obfuscated instruction stream in operation 532. In other embodiments of the present invention, optional transformations may also take place before the virtual machine instruction streams are broken into parts.

Figure 6:
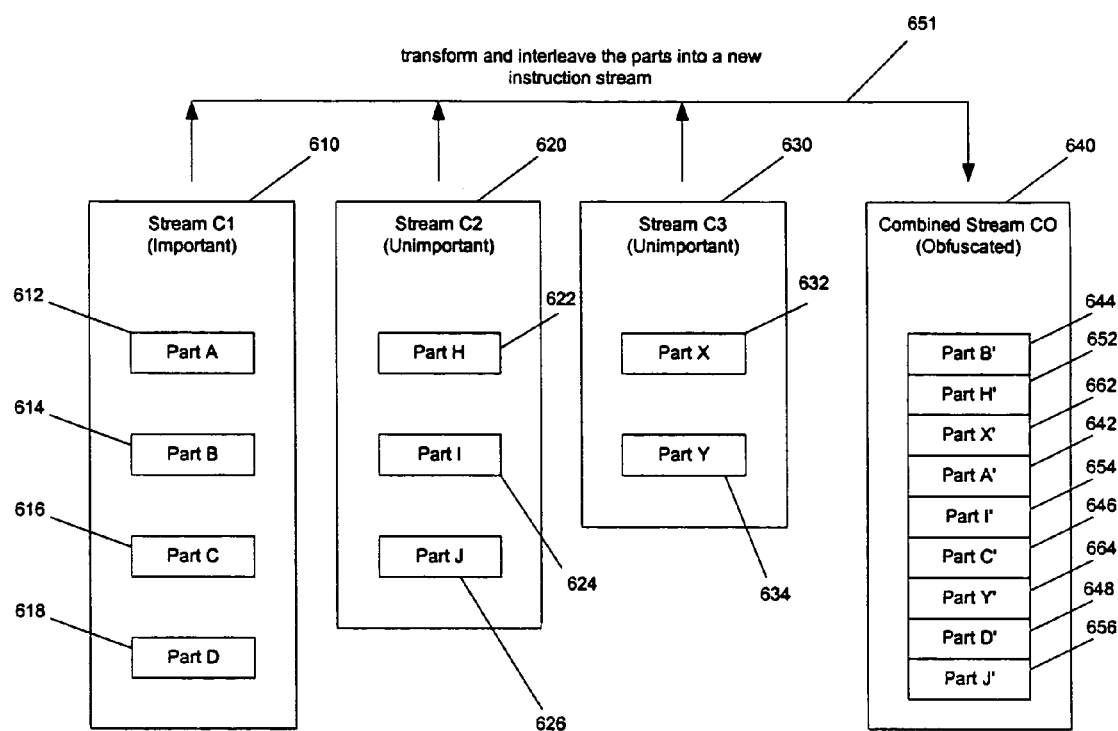
FIG. 6 shows another example of obfuscating computer instruction streams according to the present invention.

While FIG. 5 shows an example of interleaving two instruction streams into an obfuscated stream, multiple instructions streams can be interleaved into a single obfuscated instructions stream according to the present invention. FIG. 6 shows an example where three streams of computer instructions are interleaved.

The order of the parts in an interleaved stream may be different from the order of the corresponding parts in the original stream. FIG. 6 shows such an example. Parts from an important stream 610 and unimportant streams 620 and 630 are transformed and interleaved into a new combined stream 640. In FIG. 6 it is assumed that part 614 does not depend on part 612. Thus, part 614 can be moved before part 612. In the original instruction stream 610, part 612 is located before part 614. Part 612 is transformed into part 642 in the combined stream 640, and part 614 is transformed into part 644. In the combined stream 640, part 642 is placed after part 644. Parts 652 and 662, which are transformed from part 622 of stream 620 and part 632 of stream 630, are inserted between the parts 644 and 642 in the combined stream 640.

In FIG. 6 the combined stream 640 contains the parts from the important stream 610, as well as the parts from the unimportant stream 620 and 630. Since the parts from the unimportant streams can also be executed by the virtual machine to perform useful tasks, they don't have to be codes just for the purpose of obfuscation. The unimportant stream 620 and 630 can be compiled from computer programs which perform certain related tasks. These computer programs may be a part of an application.

Figure 7:
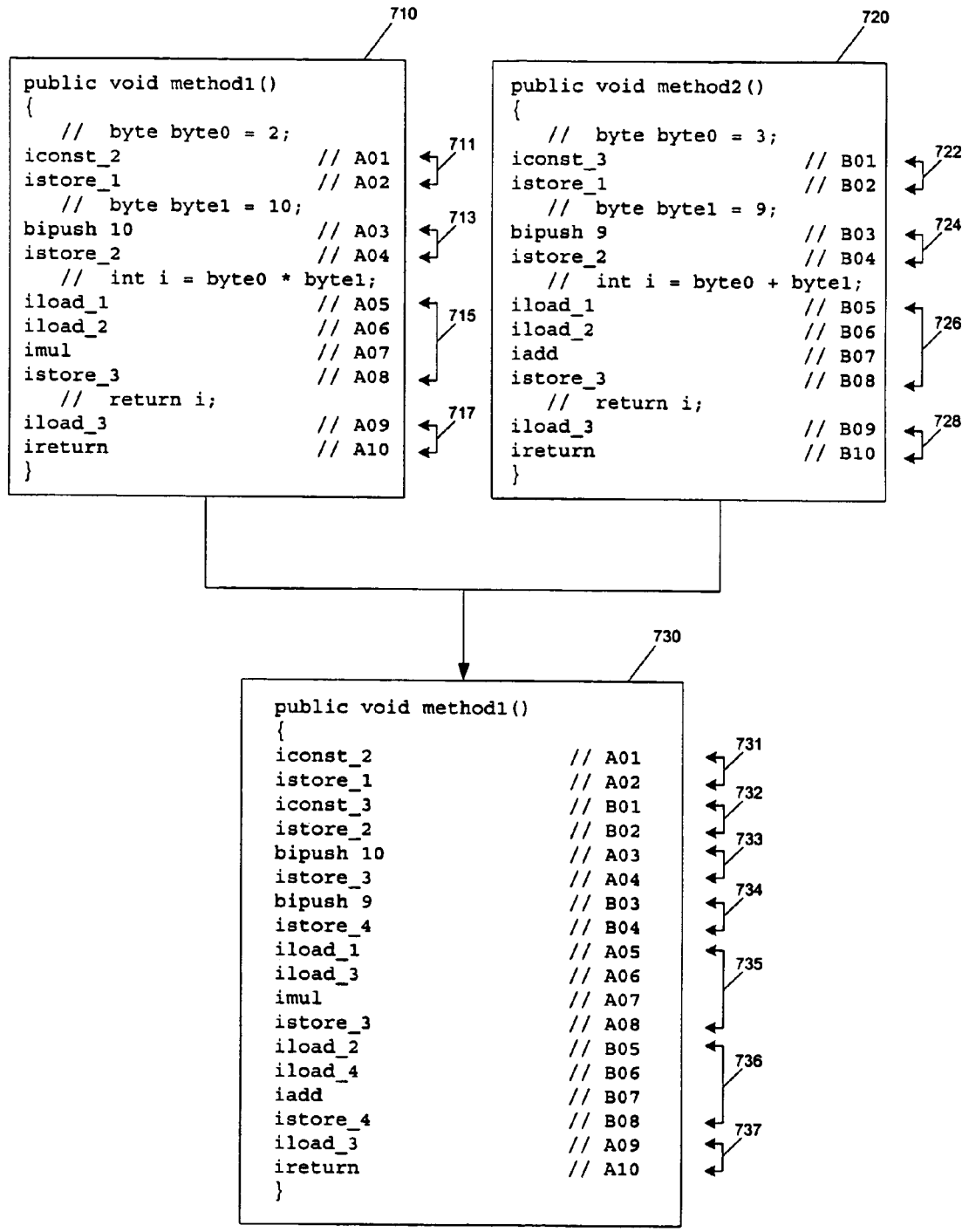
FIG. 7 shows a detailed example of interleaving parts from two computer instruction streams into an obfuscated stream.

FIG. 7 shows a detailed example of interleaving parts from two streams into an obfuscated stream. Stream 710, which shows a stream of byte codes for a method of a Java class, is the stream to be obfuscated. Stream 720 is a stream of byte codes for the purpose of obfuscation. Stream 720 may be a stream of byte codes for another method of the same class, or a stream of byte codes for a method of another class, or simply a copy of the stream 710 itself. Stream 710 can be broken into parts 711, 713, 715 and 717. Similarly, stream 720 can be broken into parts 722, 724, 726, and 728. The parts from streams 710 and 720 are interleaved into a stream 730, which performs the same logical operations as the stream 710. To prevent the parts from stream 720 from interfering the operation of the parts from stream 710, a number of transformations are performed. For example, part 722 is transformed into part 732 so that part 732 does not operate on the local variable used by part 731 which is taken from the stream to be obfuscated. Similarly, other parts from streams 710 and 720 are also transformed to avoid interference with each other. If part 728 is placed before part 737, the execution of part 728 makes part 737 not reachable, which is not a desirable side effect. However, if part 728 is placed after part 737, it will not be reachable due to part 737. Therefore, part 728 is discarded.

In one embodiment of the present invention, references to non-local variables in the parts taken from the stream for obfuscation purpose are substituted with references to variables of the same type in the stream to be obfuscated in order to avoid violating any access restriction imposed by a Java Virtual Machine. Calls to methods that invoke GUI (Graphical User Interface) operations are discarded or substituted with calls to methods that do not create noticeable effects. Some instructions in the parts from the stream for obfuscation purpose may cause control flow changes that may interfere with the proper execution of the stream to be obfuscated. Therefore, these instructions are discarded or substituted with other instructions that have no adverse effects on the proper execution of the stream to be obfuscated. From the above illustration, those skilled in the art can see that various transformations may be applied to the parts to ensure the resulting obfuscated stream is functionally equivalent to the stream to be obfuscated.

Figure 8:
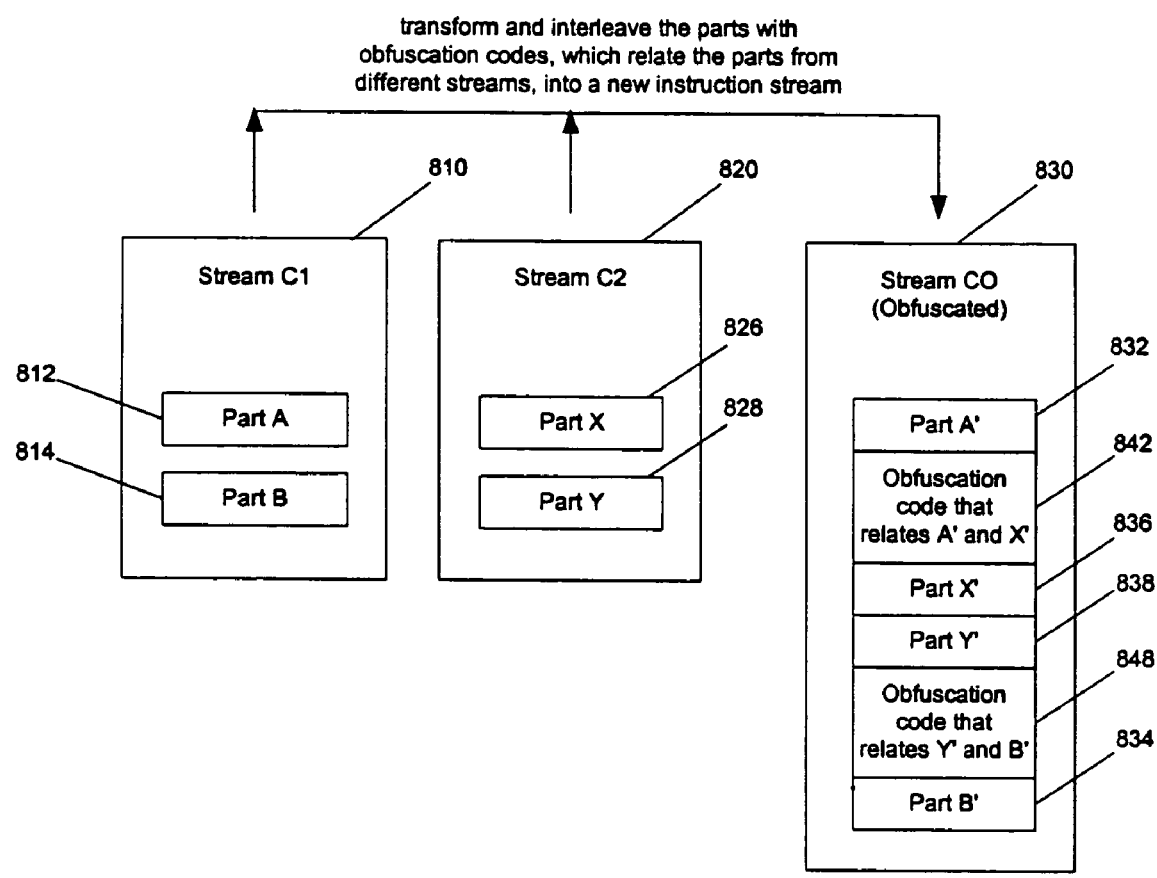
FIG. 8 shows an example of obfuscating computer instruction streams according to the present invention where transformed and interleaved parts from two streams of instructions are interrelated.

FIG. 8 shows an example of obfuscating computer instruction streams where transformed and interleaved parts from two streams of instructions are interrelated by obfuscation codes. Obfuscation codes are inserted into the obfuscated stream to relate the parts from different streams to prevent the reversal of interleaving. For example, obfuscation codes 842 and 848 in FIG. 8 are inserted into the obfuscated stream 830 to relate the parts from the instruction streams 810 and 820. Parts 812 and 826 are transformed into parts 832 and 836 in the obfuscated stream 830. Obfuscation code 842 is inserted to relate the part 832 from the stream 810 and the part 836 from the stream 820. An obfuscation code may access the variables used by different parts to interrelate them.

Figure 9:
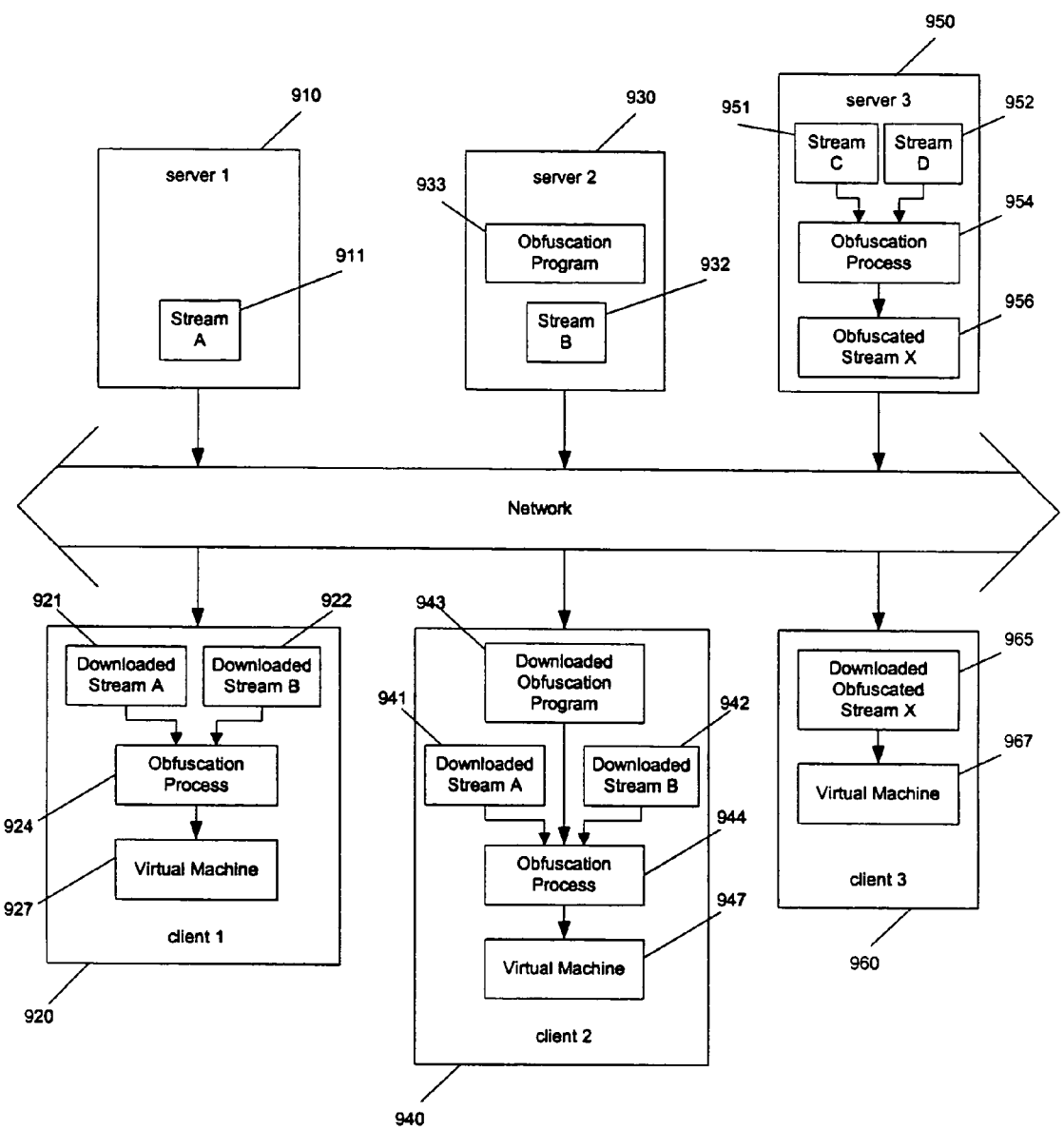
FIG. 9 shows examples of executing computer instruction streams obfuscated using various methods of the present invention.

FIG. 9 shows examples of executing computer streams obfuscated using various methods of the present invention. FIG. 9 shows a number of computers, including servers 910, 930, 950 and clients 920, 940, 960. In one scenario, a combined and obfuscated stream, generated according to one of the methods of the present invention, is transferred from one computer for execution on a virtual machine. For example, the server 950 has mechanically complied computer instruction streams 951 and 952. The parts of the instruction streams 951 and 952 are interleaved into an obfuscated stream 956. The client 960 downloads the obfuscated stream 956 from server 950 to execute on a virtual machine 967. For instance, server 950 is a web server. The obfuscated stream 956 is a Java application or a Java applet. The client 960 runs a web browser, which downloads the Java application or applet for execution on a virtual machine.

In another scenario, mechanically compiled instruction streams are transferred from a number of computers to a client before a combined and obfuscated stream is produced according to one of the method of the present invention. For example, servers 910 and 930 have instruction streams 911 and 932. The downloaded streams 921 and 922 on client 920 correspond to the streams 911 and 932 on the servers 910 and 930. After the obfuscation process 924, streams 921 and 922 are interleaved into a combined stream, which is executed on a virtual machine 927 on client 920.

In another scenario, mechanically compiled instruction streams, as well as the program which when executed causes a processor to carry to one of the method of the present invention to produce a combined and obfuscated stream, are transferred from a number of computers to a client before the parts from the transferred stream are interleaved into a combined and obfuscated stream. For example, the client 940 downloads an obfuscation program 933 from the server 930, in addition to downloading the streams 911 and 932. Having the downloaded instruction streams 941, 942 and the downloaded obfuscation program 943, client 940 executes the obfuscation program to carry out obfuscation process 944, which interleaves the parts from the instruction streams 941 and 942 into an obfuscated stream for execution on a virtual machine 947.

Figure 10:
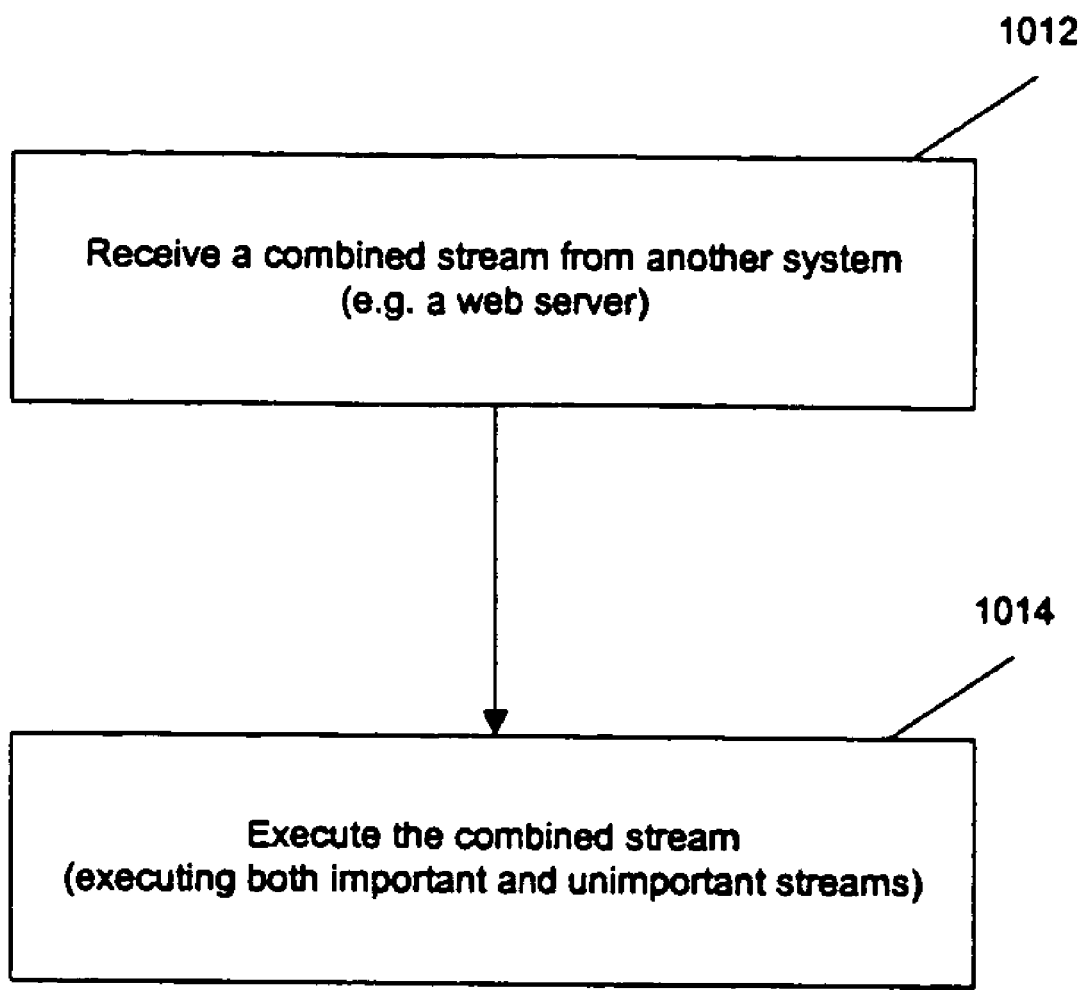
FIG. 10 shows a block diagram example of executing a combined computer instruction stream.

FIG. 10 shows a block diagram example of executing a combined instruction stream. After receiving from another system a combined stream generated using various methods of the prevent invention, a computer executes the combined stream. Although FIG. 9 or FIG. 10 suggests that the client computer receives the obfuscated stream through a network, other media may be used to facilitate the transfer. For example, floppy diskettes, ROM or other removable media may be used to transfer or distribute the combined instruction stream.

Figure 11:
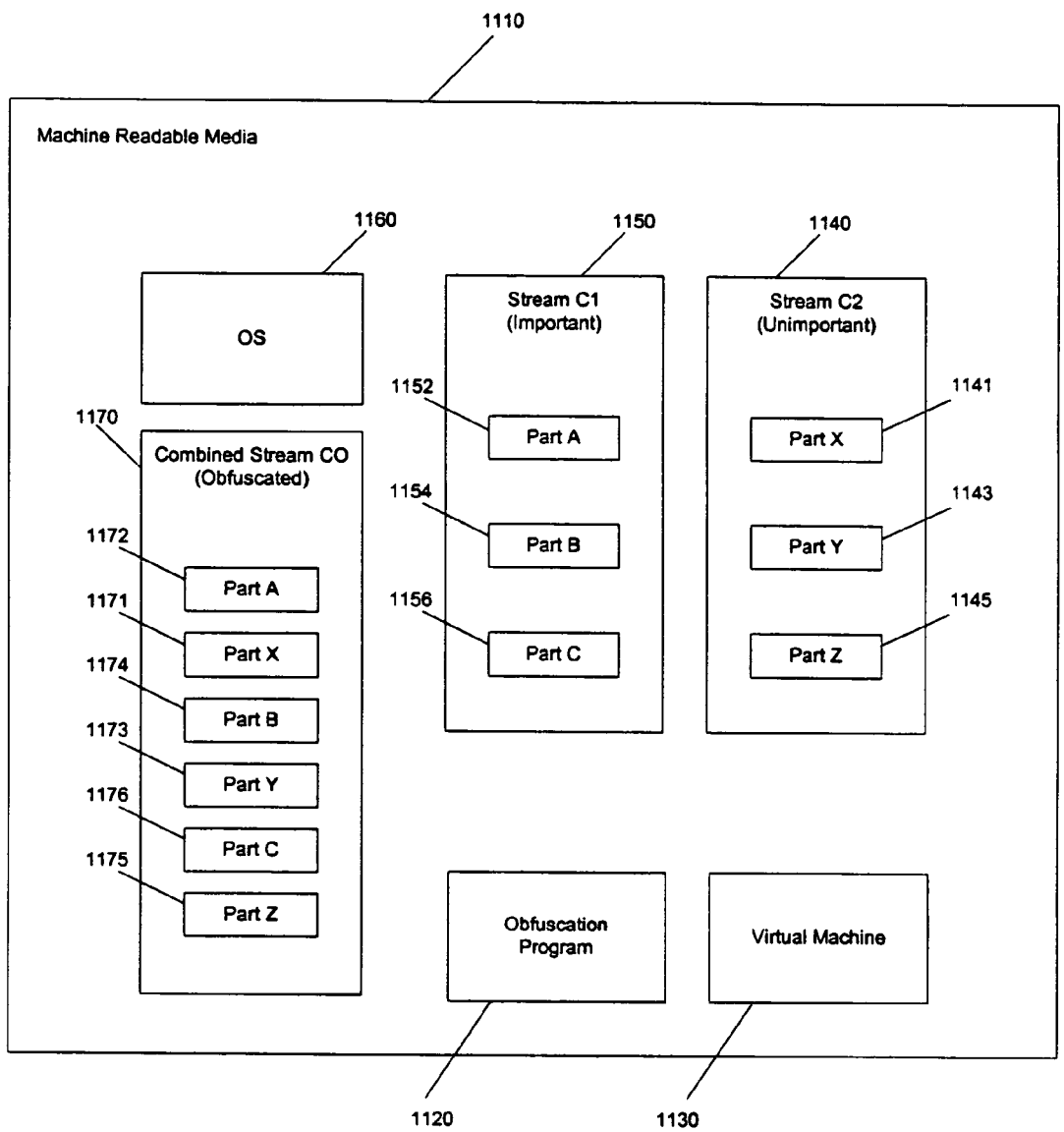
FIG. 11 shows an example of a machine readable media, which may be used to store software and data which when executed by a data processor system causes the system to perform various methods of the present invention.

FIG. 11 shows an example of a machine readable media, which may be used to store software and data which when executed by a data processor system causes the system to perform various methods of the present invention. As noted above, this executable software and data may be stored in various places including for example the ROM 107, the volatile RAM 105, the non-volatile memory 106 and/or the cache 104. Portions of this software and/or data may be stored in any one of these storage devices. The media 1110 for example may be primarily the volatile RAM 105 and the non-volatile memory 106 in one embodiment. The OS 1160 represents an operating system. Instruction streams 1150 and 1140 represent mechanically compiled virtual machine instruction streams. The obfuscated stream 1170 represents the combined stream with parts taken from instruction streams 1150 and 1140. Obfuscation program 1120 represents the computer instructions which when executed by the digital processing system cause the processing system to interleave the parts from operative instruction streams into a combined stream. For example, the parts 1152, 1154 and 1156 of the instruction stream 1150 and the parts 1141, 1143 and 1145 of the instruction stream 1140 are interleaved into an obfuscated stream 1170 which has parts 1172, 1174, 1176, 1171, 1173 and 1175. The virtual machine 1130 represents the instructions that implement a virtual machine on the processing system. The combined stream 1170 when executed on the virtual machine 1130 may perform the same set of logical operations as the instruction stream 1150.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A data processing system, comprising:
   memory means for storing an obfuscated stream, the obfuscated stream comprising parts which are interleaved, the parts having been taken from at least two operative instruction streams including a first operative instruction stream and a second operative instruction stream, the first operative instruction streams being compiled from a first source code, the second operative instruction streams being compiled from a second source code separate from the first source code; and
   processor means for executing the obfuscated stream;
   wherein the parts include a second part interleaved between a first part and a third part, the second part being of the second operative instruction stream, the first part and the third part being of the first operative instruction stream;
   wherein the second part is reachable from the first part during the execution; and
   wherein when the first part and the third part are executed, the second part is also executed.

2. The data processing system of claim 1, wherein the second part is stack balanced.

3. The data processing system of claim 1, wherein the obfuscated stream further comprises an obfuscation code that interrelates the parts from the operative instruction streams.

4. The data processing system of claim 1, wherein at least one of the parts has been transformed before the parts are interleaved and after the parts are taken from the operative instruction streams.

5. The data processing system of claim 1, wherein at least one of the parts has been so transformed before the parts are interleaved and after the parts are taken from the operative instruction streams that the obfuscated stream performs at least the same logical operations of one of the operative instruction streams.

6. The data processing system of claim 1, wherein one of the operative instruction streams has been transformed before the parts are taken from the operative instruction streams.

7. The data processing system of claim 1, wherein two of the operative instructions streams are the same.

8. A digital processing system, comprising:
memory to store an obfuscated stream, the obfuscated stream comprising parts which are interleaved, the parts having been taken from at least two operative instruction streams including a first operative instruction stream and a second operative instruction stream, the first operative instruction streams being compiled from a first source code, the second operative instruction streams being compiled from a second source code separate from the first source code; and
a processor coupled with the memory, the processor to execute the obfuscated stream;
wherein the parts includes a second part interleaved between a first part and a third part, the second part being of the second operative instruction stream, the first part and the third part being of the first operative instruction stream;
wherein the second part is reachable from the first part during the execution; and
wherein when the first part and the third part are executed, the second part is also executed.

9. The digital processing system of claim 8, wherein the second part is stack balanced.

10. The digital processing system of claim 8, wherein the memory comprises DRAM (Dynamic Random Access Memory); and wherein the obfuscated stream is stored temporarily in the DRAM.

11. The digital processing system of claim 8, wherein the obfuscated stream further comprises an obfuscation code that interrelates the parts from the operative instruction streams.

12. The digital processing system of claim 11, wherein the memory comprises DRAM (Dynamic Random Access Memory); and wherein the obfuscated stream is stored temporarily in the DRAM.

13. The digital processing system of claim 8, wherein at least one of the parts has been transformed before the parts are interleaved and after the parts are taken from the operative instruction streams.

14. The digital processing system of claim 13, wherein the memory comprises DRAM (Dynamic Random Access Memory); and wherein the obfuscated stream is stored temporarily in the DRAM.

15. The digital processing system of claim 8, wherein at least one of the parts has been so transformed before the parts are interleaved and after the parts are taken from the operative instruction streams that the obfuscated stream performs at least the same logical operations of one of the operative instruction streams.

16. The digital processing system of claim 8, wherein one of the operative instruction streams has been transformed before the parts are taken from the operative instruction streams.

17. The digital processing system of claim 16, wherein the memory comprises DRAM (Dynamic Random Access Memory); and wherein the obfuscated stream is stored temporarily in the DRAM.

18. The digital processing system of claim 8, wherein two of the operative instructions streams are the same.

19. The digital processing system of claim 18, wherein the memory comprises DRAM (Dynamic Random Access Memory); and wherein the obfuscated stream is stored temporarily in the DRAM.

20. A server data processing system, comprising:
memory means for storing an obfuscated stream, the obfuscated stream comprising parts which are interleaved, the parts having been taken from at least two operative instruction streams including a first operative instruction stream and a second operative instruction stream, the first operative instruction streams being compiled from a first source code, the second operative instruction streams being compiled from a second source code separate from the first source code;
network means for transferring the obfuscated stream to a client data processing system through a network for execution;
wherein the parts include a second part interleaved between a first part and a third part, the second part being of the second operative instruction stream, the first part and the third part being of the first operative instruction stream;
wherein the second part is reachable from the first part during the execution; and
wherein when the first part and the third part are executed, the second part is also executed.

21. The server processing system of claim 20, wherein the second part is stack balanced.

22. The server processing system of claim 20, wherein the obfuscated stream further comprises an obfuscation code that interrelates the parts from the operative instruction streams.

23. The server processing system of claim 20, wherein at least one of the parts has been transformed before the parts are interleaved and after the parts are taken from the operative instruction streams.

24. The server processing system of claim 20, wherein at least one of the parts has been so transformed before the parts are interleaved and after the parts are taken from the operative instruction streams that the obfuscated stream performs at least the same logical operations of one of the operative instruction streams.

25. The server processing system of claim 20, wherein one of the operative instruction streams has been transformed before the parts are taken from the operative instruction streams.

26. The server processing system of claim 20, wherein two of the operative instructions streams are the same.

27. A server digital processing system, comprising:
memory to store an obfuscated stream, the obfuscated stream comprising parts which are interleaved, the parts having been taken from at least two operative instruction streams including a first operative instruction stream and a second operative instruction stream, the first operative instruction streams being compiled from a first source code, the second operative instruction streams being compiled from a second source code separate from the first source code;

a processor coupled with the memory; and a communication device coupled with the processor, the communication device to communicate the obfuscated stream to a client data processing system through a network for execution;

wherein the parts include a second part interleaved between a first part and a third part, the second part being of the second operative instruction stream, the first part and the third part being of the first operative instruction stream;

wherein the second part is reachable from the first part during the execution; and wherein when the first part and the third part are executed, the second part is also executed.

28. The server digital processing system of claim 27, wherein the second part is stack balanced.

29. The server digital processing system of claim 27, wherein the obfuscated stream further comprises an obfuscation code that interrelates the parts from the operative instruction streams.

30. The server digital processing system of claim 27, wherein at least one of the parts has been transformed before the parts are interleaved and after the parts are taken from the operative instruction streams.

31. The server digital processing system of claim 27, wherein at least one of the parts has been so transformed before the parts are interleaved and after the parts are taken from the operative instruction streams that the obfuscated stream performs at least the same logical operations of one of the operative instruction streams.

32. The server digital processing system of claim 27, wherein one of the operative instruction streams has been transformed before the parts are taken from the operative instruction streams.

33. The server digital processing system of claim 27, wherein two of the operative instructions streams are the same.

34. The server digital processing system of claim 27, wherein the communication device comprises a network interface.

35. The server digital processing system of claim 27, wherein the network interface comprises an Ethernet interface.

36. A method, comprising:

storing an obfuscated stream, the obfuscated stream comprising parts which are interleaved, the parts having been taken from at least two operative instruction streams including a first operative instruction stream and a second operative instruction stream, the first operative instruction streams being compiled from a first source code, the second operative instruction streams being compiled from a second source code separate from the first source code;

transferring the obfuscated stream to a client data processing system through a network;

wherein the parts include a second part interleaved between a first part and a second part, the second part being of the second operative instruction stream, the first part and the third part being of the first operative instruction stream;

wherein the second part is reachable from the first part during the execution; and wherein when the first part and the third part are executed, the second part is also executed.

37. The method of claim 36, wherein the second part is stack balanced.

38. The method of claim 36, wherein the obfuscated stream further comprises an obfuscation code that interrelates the parts from the operative instruction streams.

39. The method of claim 36, wherein at least one of the parts has been transformed before the parts are interleaved and after the parts are taken from the operative instruction streams.

40. The method of claim 36, wherein at least one of the parts has been so transformed before the parts are interleaved and after the parts are taken from the operative instruction streams that the obfuscated stream performs at least the same logical operations of one of the operative instruction streams.

41. The method of claim 36, wherein one of the operative instruction streams has been transformed before the parts are taken from the operative instruction streams.

42. The method of claim 36, wherein two of the operative instructions streams are the same.

43. A machine readable medium containing executable computer program instructions which when executed by a data processing system cause said system to perform a method, the method comprising:

storing an obfuscated stream, the obfuscated stream comprising parts which are interleaved, the parts having been taken from at least two operative instruction streams including a first operative instruction stream and a second operative instruction stream, the first operative instruction streams being compiled from a first source code, the second operative instruction streams being compiled from a second source code separate from the first source code;

downloading the obfuscated stream to a client data processing system through a network;

wherein the parts include a second part interleaved between a first part and a third part, the second part being of the second operative instruction stream, the first part and the third part being of the first operative instruction stream;

wherein the second part is reachable from the first part during the execution; and wherein when the first part and the third part are executed, the second part is also executed.

44. The medium of claim 43, wherein the second part is stack balanced.

45. The medium of claim 43, wherein the obfuscated stream further comprises an obfuscation code that interrelates the parts from the operative instruction streams.

46. The medium of claim 43, wherein at least one of the parts has been transformed before the parts are interleaved and after the parts are taken from the operative instruction streams.

47. The medium of claim 43, wherein at least one of the parts has been so transformed before the parts are interleaved and after the parts are taken from the operative instruction streams that the obfuscated stream performs at least the same logical operations of one of the operative instruction streams.

48. The medium of claim 43, wherein one of the operative instruction streams has been transformed before the parts are taken from the operative instruction streams.

49. The medium of claim 43, wherein two of the operative instructions streams are the same.

* * * * *